Patented Apr. 23, 1935

UNITED STATES PATENT OFFICE 1,998,744

BAKING ENAMEL

Richard T. Ubben, Wilmington, Del., assignor to E. I. du Pont de Nemours & Company, Wilmington, Del., a corporation of Delaware No Drawing. Application July 5, 1932, Serial No. 620,983

5 Claims. (Cl. 134—26)

This invention relates to coating compositions, more particularly to water-resistant protective coatings baked from aqueous solutions of polyhydric alcohol-polybasic acid resins.

It has been proposed to utilize aqueous solutions of water soluble salts of polyhydric alcohol-polybasic acid resins in coating and similar compositions by treating the preformed resin with water soluble basic materials, such as ammonium or sodium hydroxide or ethanolamines. These water solutions have the highly important commercial advantages of non-inflammability and an extremely cheap solvent, as well as other advantages. However, films obtained from these aqueous solutions, although water-insoluble to a certain extent, are, nevertheless, water-sensitive to a marked degree even upon baking at relatively high temperatures. When immersed in water for a short time, the baked film begins to whiten and to soften to such an extent that it may be readily scraped off with a blunt instrument, or even with the finger-nail.

This invention has as an object the production of compositions comprising water solutions of polyhydric alcohol-polybasic acid resins, films of which, after the usual baking procedure, are markedly harder and more water-resistant than those produced heretofore from aqueous solutions of these resins. A further object is a new method of making these compositions. A still further object is the production of articles having a hard water-resistant film of polyhydric alcohol-polybasic acid resin laid down from an aqueous solution of the resin. Other objects will appear hereinafter.

These and other objects are accomplished by adding a water-soluble polyhydric alcohol to the aqueous solution of the partially preformed resin, and completing the resinification in the film, plastic, or impregnated body during the baking process. An excess of polybasic acid is preferably used in making the resin.

More specifically, I have discovered that compositions capable of giving baked films of improved quality may be prepared by a process which involves; first, reacting the polyhydric alcohol with excess polybasic acid, and then adding to the aqueous solution of the resin thus obtained a water soluble polyhydric alcohol in an amount approximately equivalent to that which would be required to neutralize the original excess polybasic acid.

The aqueous solution of the resin is prepared by treating the partially preformed resin with an aqueous solution of a water-soluble volatile base such as ammonia or methylamine. The methods of incorporating the additional polyhydric alcohol may be various. For example, the resin may be dissolved in the mixed aqueous solution of polyhydric alcohol and base, or the additional polyhydric alcohol may be first stirred with the molten resin and this mixture dissolved in the aqueous solution of the base, or the resin may be dissolved in an aqueous solution of the base, and the polyhydric alcohol added to this solution. The latter method generally is easier and, in some cases, gives better results. In that variation of the process in which the molten resin and the additional polyhydric alcohol are mixed previous to dissolving in the aqueous base, some slight further esterification may take place but, because of the time factor, the amount is so slight as to be unimportant. The mass of the additional polyhydric alcohol remains available for completing the resinification during the baking step.

In making the resin, the polyhydric alcohol and polybasic acid, with or without certain other ingredients known as modifying agents and described more fully hereinafter, may be fused at any suitable temperature above their mixed melting point which will produce resinification, usually in the range 150–250° C., the heating being discontinued before the infusible, insoluble stage is reached. As is well-known to those skilled in the art, this varies to a considerable extent, depending on such factors as the nature of the polyhydric alcohol and polybasic acid (number of hydroxyl and carboxyl groups), the nature and amount of any monovalent modifying agents and fatty oils (or other esters) present, the temperatures employed, the exact variation from stoichiometrical proportions of ingredients, etc. As a rule, I have found that the excess of polybasic acid which is obtained by using the polyhydric alcohol in an amount chemically equivalent to about 70–90% by weight of the polybasic acid is preferred.

Due to excess polybasic acid, the partially preformed resins has a relatively high acid number. This is desirable since it renders the resin more readily soluble in the aqueous solution of the volatile base. The exact value of this acid number varies with the nature of the resin and the amount of excess polybasic acid.

Among the most useful types of modifying agents for the resin are fatty oils and fatty oil acids. Where fatty oils are employed, it is desirable first to heat the oil and polyhydric alcohol together, preferably in the presence of a trace of catalyst such as lime, boric acid, litharge or sodium hydroxide, before adding the remaining ingredients.

The step of preparing the aqueous solution of resin is preferably carried out while the resin is still molten, say at 100–150° C., or occasionally even higher. The resin may, however, first be allowed to cool, then pulverized and stirred with the water solution of the basic material at ordinary or elevated temperatures, after which the additional amount of the same polyhydric alcohol or mixture of polyhydric alcohols used in the original resin, or of a different polyhydric alcohol or mixture of polyhydric alcohols, is added. The amount of water solution of the base to be added will be, as a rule, slightly more than that calculated from the acid value of the resin to give a basic solution. This can be checked by adding a sufficient amount to cause the resulting solution to be faintly basic towards litmus. The concentration of the basic material in water may vary according to the viscosity desired for the solution. If a very concentrated form is added, the solution can be diluted later with water, although this is usually less satisfactory. The amount of polyhydric alcohol added should not vary too far from that chemically equivalent to excess polybasic acid.

The solutions are relatively stable, but, because of the volatility of the base and/or the relatively loose chemical combination of the high acid resin therewith, the high acid resin occasionally precipitates when the solution is allowed to stand for a long time, say six months. When this happens, the resin is readily redissolved by adding more of a volatile base, with stirring.

In the manufacture of articles having a baked coating of my improved composition, the baking step is best carried out by progressively raising the temperature up to 150–175° C. over a period of 20–30 minutes, then holding at this point for 30–45 minutes. The range of 150–175° C. seems to be most conductive to driving off the loosely combined base and causing further esterification with a minimum loss of polyhydric alcohol. Temperatures outside this range, however, can be used satisfactorily in many cases.

The water-soluble basic material used to dissolve the resin should be sufficiently volatile to be driven off at ordinary baking temperatures in order to produce films having the highest degree of water-resistance. For this reason, I prefer to use ammonia or the more volatile of the organic bases such as the lower aliphatic amines, rather than metallic hydroxides such as those of sodium or potassium.

Non-volatile alkalies such as potassium or sodium hydroxide or relatively non-volatile alkalies such as tetra-butylammonium hydroxide may be used in place of the volatile bases but require somewhat different further treatment, that is, exposure after the coating or impregnating step and before or during the baking step to acid in the vapor phase. The acid used in this variation of the process should be a volatile, relatively weak acid, such as acetic, chloroacetic, or formic. The treatment with non-volatile bases followed by treatment with acid does not form a preferred embodiment of the present invention inasmuch as the products thereby obtained do not show as great a water resistance as do the products obtained when using volatile bases followed by baking alone.

The following examples further illustrate the method of carrying out my invention:

*Example I*

|   | Parts |
|---|---|
| Glycerol | 26.76 |
| Phthalic anhydride | 70.27 |
|   | 97.03 |

The above ingredients are carried to a temperature of 200° C. over a period of one hour, accompanied by stirring, then held at this point for an additional hour. This product shows an acid value of 155. Heating is then discontinued and the temperature allowed to fall to 150° C. Two and ninety seven one-hundredths parts of glycerol is stirred into the molten mass. Twenty-five parts of this mixture, cooled to 125° C., is dissolved in 4.4 parts of 28% ammonia, previously diluted with 70.6 parts of water, preferably by adding the diluted ammonia to the resin. A clear solution having a basic reaction to litmus and containing uncombined glycerol is readily formed. This solution shows a viscosity of 11.4 seconds in the No. 10 brass cup at 23° C. When flowed on glass plates or steel panels and baked on a heat schedule of 20 minutes up to 150° C. and 30 minutes at 150–175° C., the loosely combined ammonia is eliminated, the resin of high acid number is esterfied further with the glycerol and a very hard, water-resistant film is obtained. In preparing this product, the total quantity of glycerol used was chemically equivalent to the phthalic anhydride; however, 10% of the total was reserved for further esterification during the baking step.

*Example II*

|   | Parts |
|---|---|
| Ethyleneglycol | 7.41 |
| Glycerol | 20.29 |
| Adipic acid | 70.04 |
|   | 97.74 |

The above ingredients are carried to 200° C. over a period of one hour, the temperature being maintained at this point for an additional hour, or until the acid number reaches 150–155. After cooling to room temperature, 24.44 parts of this product is dissolved in 3.87 parts of 28% ammonia previously diluted with 71.12 parts of water. The remainder of the glycerol (0.57 part based on the 24.44 parts of the partially preformed resin) is stirred into this solution, which is thin, clear, limpid, and slightly basic to litmus. Films baked for one hour at 175° C. are very light-colored, clear, and water-resistant.

The above process is applicable with equal facility to polyhydric alcohol-polybasic acid resins modified by the various agents such as monohydric alcohols, monobasic acids, and esters, which are known to be valuable agents for imparting certain desired characteristics, such as improved durability, solubility, adhesion, etc., to resins of this type. The products most suitable for coating compositions, as regards durability and water-resistance, are those modified by fatty oils or fatty oil acids. The fatty oils are, for the most part, mixed esters of glycerol and/or mixtures of glycerides, and the fatty oil acids are mixtures of monobasic fatty acids derived from the saponification of the oils. The succeeding examples show the preparation of my improved compositions from resins modified with substances of the type just mentioned.

*Example III*

|   | Parts |
|---|---|
| Glycerol | 18.92 |
| Phthalic anhydride | 49.76 |
| Linseed oil acids | 26.49 |
|   | 95.17 |

These ingredients are carried to a temperature of 200° C. over a period of one hour, then held at this point for 1⅓ hours. The product obtained shows an acid number of 120. Heating is discontinued and the temperature allowed to fall to 150° C. Four and eighty-three one-hundredths parts of glycerol (remainder for equivalent proportions) is stirred into the molten mass. Twenty-five parts of resulting mixture, cooled to 125° C., is dissolved in 3.75 parts of 28% ammonia previously diluted with 71.25 parts of water. A clear solution containing uncombined glycerol and having a faintly basic reaction to litmus is readily formed. Films flowed from this solution and baked on a schedule of 20 minutes up to 150° C. and 45 minutes at 150–165° C. are very hard and water-resistant.

As mentioned hereinbefore, among the more important esters for modifying the resins of my improved compositions are the glycerides of fatty acids, such as the fatty oils. These esters probably form an integral part of the resin by alcoholysis or ester interchange, a reaction which, although quite feasible, does not proceed as rapidly as that of esterification. For this reason, it is frequently desirable to heat the ester (e. g., a drying oil) and polyhydric alcohol together, preferably in the presence of a trace of litharge or sodium hydroxide as a catalyst, before adding the polybasic acid and any other acidic ingredients. The following example discloses a resin modified with fatty oil and also the use of an organic base as the reagent for dissolving the resin.

*Example IV*

|  | Parts |
|---|---|
| Cottonseed oil | 23.24 |
| Glycerol | 20.50 |
| Phthalic anhydride | 53.92 |
|  | 97.66 |

The cottonseed oil and glycerol, to which is added 0.1 part sodium hydroxide, are brought to a temperatre of 250° C. over a period of one hour, then held at this point for 20 minutes. The phthalic anhydride is added and the mass heated and stirred for 1⅓ hours at 200° C. A soft, light-colored resin of acid number 117 is obtained. Heating is discontinued and the temperature allowed to fall to 125° C. This resin, while still molten, is dissolved in a mixture of 2.34 parts glycerol, 33.5 parts of a 30% aqueous solution of dimethylamine, and 264 parts of water. A clear limpid solution, faintly basic to litmus and contaning uncombined glycerol, is readily obtained. Films baked from this solution, on a schedule of 20 minutes up to 160° C., and 25 minutes at 160–175° C., are hard, tough and water-resistant.

The term "monobasic acid" as a modifying agent includes natural resinic acids such as abietic acid. The following example illustrates the use of such a resin ingredient.

*Example V*

|  | Parts |
|---|---|
| Glycerol | 20.97 |
| Abietic acid (A. N. 173) | 26.76 |
| Phthalic anhydride | 49.92 |
|  | 97.65 |

The glycerol and abietic acid are heated together at 250° C. for 2 hours or until a product of acid number 15–20 is obtained. The temperature is allowed to fall below 200° C., the phthalic anhydride added gradually and heating then continued at 200° C. for 1½ hours or until a product of acid number 140–150 is obtained. The temperature is allowed to fall to about 140° C., and 2.33 parts of glycerol is stirred into the molten mass. Twenty-five parts of this mixture is dissolved in 4.5 parts of 28% ammonia previously diluted with 70.5 parts of water. The solution is basic to litmus, slightly cloudy and contains uncombined glycerol. After baking for 15 minutes at 100° C., the film was perfectly clear, and by baking further (30 minutes at 175°), it was rendered hard and water-resistant, but slightly dark. It is recommended that for best results in processes similar to this example, a good grade of abietic acid be used.

The resins disclosed herein may be made from polyhydric alcohols other than the glycerol and ethylene glycol mentioned in the examples. As examples of other suitable alcohols there may be mentioned butylene glycol, diethylene glycol, triethylene glycol, sorbitol, polyglycerols, pentaerythritol, mannitol, and monoalkyl and aryl ethers of glycerol such as monobenzylin, pentaerythritol diethyl ether, etc. In addition to phthalic anhydride and adipic acid, there may be used such polybasic acids as succinic, sebacic, fumaric, tartaric, citric, dilactylic, thio-dilactylic, salicyl acetic, chlorophthalic, diphenic, quinolinic, hexahydrophthalic, naphthalic, pyromellitic, tricarballylic, etc. Mixtures of polyhydric alcohols and/or mixtures of polybasic acids are often desirable.

In addition to the fatty oil acids of Example III and the resin acid of Example V, suitable monobasic acid modifying agents for replacing a portion of the polybasic acid include the following: simple fatty acids, such as butyric, stearic, and oleic; various other fatty oil acids, such as those derived from the saponification of castor, China wood, soya bean, rubberseed, sunflower seed, cocoanut, and fish oils, etc.; aromatic acids, such as benzoic, salicylic, naphthoic, and benzoyl-benzoic; other aliphatic acids, such as lactic, and pyruvic acids; and other natural acidic gums such as Kauri, Pontianac, and Congo. Other suitable ester modifying agents, in addition to the cottonseed oil of Example IV, include such esters as linseed oil, China wood oil, perilla oil, soya bean oil, cocoanut oil, castor oil, rosin glyceride, dibutyl phthalate, stearin, and amyl acetate. When the neutral esters are used as modifying agents, no compensating change in the proportion of alcoholic and acidic ingredients is made. Among the monohydric alcohols useful for replacing a portion of the polyhydric alcohol in the production of modified resins are butyl, cetyl, oleyl, ethoxyethyl, benzyl, and cyclohexyl, alcohols, alkyl lactates, etc. These are preferably, though not necessarily, added initially to the reaction mixture of resin ingredients rather than incorporated with the polyhydric alcohol in the aqueous solution of the resin. It is to be understood that by the term "modifying agent" as used herein, is meant monohydric alcohols, both aliphatic and aromatic; monobasic acids, i. e., simple fatty acids, mixtures of fatty acids (fatty oil acids), aromatic monobasic acids, and natural acidic gums; esters as exemplified by fatty oils, simple glycerides (e. g., stearin, triacetin), esters of natural acidic gums (e. g., ester gum) and various other esters such as dibutyl phthalate, tricresyl phosphate, etc. By the term polyhydric alcohol-polybasic acid resin, is meant the resinous reaction product obtained by reacting a polyhydric alcohol with an organic polybasic acid, with or without one or more modifying agents, as defined above. By the term "oil modified resin"

is meant resins of the type described herein which have been made with either a fatty oil or the equivalent amount of fatty oil acid.

As reagents for solubilizing the resinous products, any soluble base may be used, the more volatile aliphatic and alicyclic ones being preferred, because of their basicity and volatility at the baking temperatures used. Methylamine, diethylamine, butylamine, cyclohexylamine, ethylene diamine, tributylamine, ethanolamine, etc., may be employed instead of the ammonia and dimethylamine disclosed in the examples.

The process of reacting the resin ingredients can be carried out in open or closed vessels of glass, enamel, or of various metals such as iron, aluminum, or Monel, with or without the presence of esterification catalysts such as sulfuric acid and sulfonic acids. An atmosphere of an inert gas, such as nitrogen, flue gas, or carbon dioxide, tends to produce lighter-colored products. Mechanical agitation is advisable and can be accomplished by stirring or blowing with the inert gas, preferably the former. Reduced or increased pressures can, at times, be used advantageously. Auxiliary condensing systems, such as a short air-cooled reflux condenser, which will permit the water of reaction to escape but retain for the most part any volatile resin ingredients, are often useful. It is also possible to carry out the first step in the presence of a non-reactive solvent, such as toluol or chlorobenzene; in such cases, if the solvent is water-insoluble, it is desirable to remove the solvent, preferably in vacuo, before carrying out the second step of dissolving in the aqueous solution of the base.

In baking the coating of these improved compositions, the temperature may range from 125-225° C., or even higher. The optimum range is 150-175° C. In general, that range of temperature and time is used which will eliminate the loosely combined base most readily and, at the same time, esterify the film further with a minimum loss of polyhydric alcohol.

The compositions of the present invention are especially valuable as baking and insulating varnishes and enamels which may be used for coating automobile fenders, wire, and metallic surfaces in general. The following examples are more definite illustrations of how these improved solutions can be made into baking enamels:

Example VI

| | Parts |
|---|---|
| Solution of Example III | 77.50 |
| Water | 11.65 |
| Ethyl alcohol | 7.75 |
| Carbon black | 3.10 |
| | 100.00 |

The ethyl alcohol above, although not essential, was used to reduce the viscosity of the solution, thus giving a product of somewhat higher solids content at spraying viscosity. For this purpose, other water-soluble solvents can also be used, such as acetone, ethyl lactate, glycol monoethyl ether, etc. The above enamel is especially suitable for automobile bodies and fenders, as well as metallic surfaces in general. Instead of carbon black, other pigments such as chrome green, paratoner red, ultramarine blue, etc., may be used.

While the preferred embodiment of the invention is improved baking enamels, compositions may also be used to coat, impregnate, toughen, glaze or render water-resistant any article or porous body which can be baked at the moderately high temperatures necessary for the process, such as certain types of wood pulp, paper, fabrics, porous stone, earthenware, etc.; such products can be used as book-binding materials, leather substitutes, etc. For book-binding and like uses, casein, gelatin, mineral fillers, etc., can be added, and the composite article hardened by treatment with formaldehyde. My aqueous solutions may be mixed or emulsified with natural or synthetic rubber and thereafter coagulated, either alone, or on fabrics, paper, etc., and the baking which completes the resinification carried out simultaneously with the curing and vulcanization of the rubber. An especially valuable use for my aqueous solutions containing uncombined polyhydric alcohol is as softeners for plastic compositions, especially casein plastics, which are to be hardened by heat treatment; formaldehyde is also used in this hardening of the casein plastic. Other uses include adhesives and cements for general use; binders for cellulose acetate, mica, and glass plates, in the manufacture respectively of laminated sheet and tube products, insulating materials, and safety glass.

While it is not desired to limit this invention to any theory for explaining my discovery, it is believed that the improved water-resistance of the baked films and other products produced in accordance with the present invention is due to the following reasons: The excess acid used in reacting the polyhydric alcohol and polybasic acid causes a more complete esterification of the alcohol in the first step of the process than is the case where equivalent proportions of acid and alcohol are used. In the latter case, an appreciable percentage of the secondary (or beta) hydroxyl groups are probably unesterified. Baking does not complete the esterification of the remaining free acidity as readily as it does in this process where available primary (or alpha) hydroxyl groups are present, as the result of the final addition of glycerol or other polyhydric alcohol. The net result is a film of lower acid number (which is known to be consistent with greater hardness and durability) when a portion of the polyhydric alcohol is added for the baking step. Whatever the true explanation may be, it has been found that it is easier to esterify further with the free alcohol than with alcohols which are already partially combined; that is, are already within the resin molecules.

From the foregoing, it will be apparent that the prior process of making aqueous solutions of polyhydric alcohol-polybasic acid resins has been improved, particularly for the case where the products are to be applied as coating compositions for metallic surfaces. By reserving a portion of the polyhydric alcohol for addition to the resin solution, two things are accomplished: (1) a resin of higher acid number is obtained which is, as a result, more easily soluble in the aqueous solution of the basic substances; (2) the esterification can be carried further than in the prior process by heating with additional polyhydric alcohol during the baking step, simultaneously with the elimination of the combined base. This process gives films, which, in both the clear and pigmented forms, are markedly superior in hardness and water-resistance.

As illustrating the improvement of these new products over those previously used, a resin was prepared from the following proportion of ingredients: Glycerol 23.75 parts, phthalic anhydride 49.76 parts, linseed oil acids 26.49 parts. This resin is substantially the same as one used in making an aqueous solution in the prior art and the ingredients are the same as in Example III, except that the glycerol was all added initially as is the conventional practice. These ingredients were heated on the same schedule as those of Example III, a product having an acid number of 118 being obtained. The resin thus produced was dissolved in ammonium hydroxide in the same way as in the mentioned example, no additional glycerol being added. Films flowed from aqueous solutions of the resin and that of Example III were baked side by side for 45 minutes at 150–165° C. The film obtained from the resin made according to the present invention was definitely harder and more water-resistant as shown by the following tests made with Pfund film hardness tester. In these tests the resin film of the aqueous composition of Example III is designated by the letter A and the resin film of the aqueous composition made in accordance with the prior art as just mentioned is designated by the letter B.

|   | After baking | After baking and immersion of 1 hour in water |
|---|---|---|
| A | 160 grams | 110 grams. |
| B | 2 grams | Less than 1 gram. |

The units referred to in this test (i. e., hardness as expressed in grams) represent that weight which, transferred through an increased by a lever arm of standard length, is necessary to make a microscopic indentation of a standard size on the film.

The following further qualitative test was made. After several days' immersion in water, the film B above showed whitening, blistering, and softening to such an extent that it could easily be scraped off with the finger nail, while the film A, immersed side by side with B, was still hard and intact.

The same observations as the above were found to be true with pigmented products. Each of the two water-soluble products was pigmented with carbon black, baked side by side, tested for hardness, immersed side by side in water for several hours and tested for hardness again. The film obtained according to the present invention was definitely superior by both the qualitative and quantitative tests.

As many apparently widely different embodiments of this invention may be made without departing from the spirit and scope thereof, it is to be understood that I do not limit myself to the specific embodiments thereof except as defined in the following claims.

I claim:

1. A composition of matter comprising an aqueous solution of free polyhydric alcohol, present in substantial amount, and a water-soluble salt of a polyhydric alcohol-polycarboxylic acid resin and a volatile base, said resin being the reaction product of polyhydric alcohol and polycarboxylic acid in an amount at least 10% in excess of that which is chemically equivalent to the polyhydric alcohol.

2. The composition of claim 1 in which the polyhydric alcohol is glycerol and the polycarboxylic acid is phthalic.

3. A composition of matter comprising an aqueous solution of free polyhydric alcohol, present in substantial amount, and a salt of a volatile base with a drying oil modified polyhydric alcohol-polycarboxylic acid resin, said resin being the reaction product of ingredients comprising a polyhydric alcohol and a polycarboxylic acid, the acidic resin ingredient or ingredients being employed in an amount at least 10% in excess of that which is chemically equivalent to the polyhydric alcohol employed in making the resin.

4. The composition of claim 3 in which the polyhydric alcohol is glycerol and the polycarboxylic acid is phthalic.

5. Process which comprises heating a polyhydric alcohol with at least 10% excess of a resinifying polycarboxylic acid until a fusible, soluble resin is obtained, dissolving said resin in an aqueous solution of a volatile, water-soluble base, and adding to the aqueous solution thereby obtained an amount of polyhydric alcohol substantially chemically equivalent to the original excess polycarboxylic acid.

RICHARD T. UBBEN.